US012290774B2

United States Patent
Zaffetti (10) Patent No.: US 12,290,774 B2
(45) Date of Patent: May 6, 2025

(54) PUMP FILTER WITH PREDETERMINED SWIRL

(71) Applicant: Hamilton Sundstrand Corporation, Charlotte, NC (US)

(72) Inventor: Mark A. Zaffetti, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 570 days.

(21) Appl. No.: 17/545,103

(22) Filed: Dec. 8, 2021

(65) Prior Publication Data
US 2023/0173420 A1   Jun. 8, 2023

(51) Int. Cl.
*B01D 46/00* (2022.01)
*B01D 46/52* (2006.01)
*B33Y 80/00* (2015.01)

(52) U.S. Cl.
CPC ..... *B01D 46/0001* (2013.01); *B01D 46/0016* (2013.01); *B01D 46/52* (2013.01); *B01D 2201/30* (2013.01); *B01D 2201/31* (2013.01); *B33Y 80/00* (2014.12)

(58) Field of Classification Search
CPC ............ B01D 46/0001; B01D 46/0016; B01D 46/52; B01D 2201/30; B01D 2201/31; B01D 29/111; B01D 29/33; B01D 35/023; B33Y 80/00; B33Y 10/00; B22F 2005/004; B22F 2999/00; B22F 3/1115; B22F 5/10; B22F 10/28; Y02P 10/25; F04D 29/708; F04D 29/026
USPC ........................................................ 210/348
See application file for complete search history.

(56) References Cited

U.S. PATENT DOCUMENTS

| 2,985,306 A * | 5/1961 | Statzell ................ B01D 35/147 |
| | | 210/333.1 |
| 4,439,109 A | 3/1984 | Wood |
| 5,511,585 A | 4/1996 | Lee, II |
| 9,987,508 B2 * | 6/2018 | Cockerham ........ B01D 46/0001 |
| 2008/0072551 A1 * | 3/2008 | Zuberi ............... B01D 39/2082 |
| | | 423/327.2 |
| 2018/0283794 A1 | 10/2018 | Cerny et al. |
| 2023/0405501 A1 * | 12/2023 | Weislogel .............. B01D 50/20 |

FOREIGN PATENT DOCUMENTS

| DE | 102018119730 A1 | 2/2020 |
| EP | 3594550 A1 | 1/2020 |
| WO | 2016204484 A1 | 12/2016 |

OTHER PUBLICATIONS

Abstract of DE102018119730 (A1), Published: Feb. 20, 2020, 1 page.
European Search Report for Application No. 22211440.7, mailed Apr. 26, 2023, 6 pages.

* cited by examiner

*Primary Examiner* — Ekandra S. Miller-Cruz
(74) *Attorney, Agent, or Firm* — CANTOR COLBURN LLP (57) ABSTRACT

A lattice filter for use in an inlet housing of a pump assembly including a lattice filter body extending from a filter inlet end to a filter outlet end. The lattice filter having a lattice structure. The lattice filter also includes one or more passageways within the lattice filter body. Each of the one or more passageways includes a passageway inlet located at the filter inlet end and a passageway outlet located at the filter outlet end. Each of the one or more passageways extend from the passageway inlet to the passageway outlet.

14 Claims, 6 Drawing Sheets

PUMP FILTER WITH PREDETERMINED SWIRL

BACKGROUND

The embodiments herein generally relate to inlet housings containing filters for pumps and more specifically to a monolithic additively manufactured inlet filter housing and filter.

Filter housings may use filters which may be expensive, have long lead times for delivery, and may be limited in size and shape such that design options are limited for the inlet housing. In addition, such inlet housings may be large and/or heavy in order to withstand normal operational pressures. It would be beneficial for the filter to provide structural support for the filter housing.

BRIEF SUMMARY

According to one embodiment, a lattice filter for use in an inlet housing of a pump assembly is provided. The lattice filter includes a lattice filter body extending from a filter inlet end to a filter outlet end. The lattice filter having a lattice structure. The lattice filter also includes one or more passageways within the lattice filter body. Each of the one or more passageways includes a passageway inlet located at the filter inlet end and a passageway outlet located at the filter outlet end. Each of the one or more passageways extend from the passageway inlet to the passageway outlet.

In addition to one or more of the features described above, or as an alternative, further embodiments may include that each of the one or more passageways curve, swirl, or spiral between the passageway inlet and the passageway outlet.

In addition to one or more of the features described above, or as an alternative, further embodiments may include that each of the one or more passageways curve, swirl, or spiral around a central longitudinal axis of the lattice filter body between the passageway inlet and the passageway outlet. The central longitudinal axis extends down a center of the lattice filter body from the filter inlet end to the filter outlet end.

In addition to one or more of the features described above, or as an alternative, further embodiments may include that each of the one or more passageways is devoid of the lattice structure of the lattice filter body or contains the lattice structure.

In addition to one or more of the features described above, or as an alternative, further embodiments may include that each of the one or more passageways are a corkscrew passageway formed by a corkscrew wall that spirals around a central longitudinal axis A of the lattice filter body between the passageway inlet and the passageway outlet. The central longitudinal axis extends down a center of the lattice filter body from the filter inlet end to the filter outlet end.

In addition to one or more of the features described above, or as an alternative, further embodiments may include that the corkscrew passageway has the lattice structure of the filter body.

In addition to one or more of the features described above, or as an alternative, further embodiments may include that the corkscrew wall includes one or more orifices.

In addition to one or more of the features described above, or as an alternative, further embodiments may include that the corkscrew wall is solid.

In addition to one or more of the features described above, or as an alternative, further embodiments may include that the filter assembly is monolithic and includes: a filter housing having a tubular shape with an inlet aperture boundary at an inlet end and an outlet aperture boundary at an outlet end; a lattice filter that is integrally formed with the filter housing via an additive manufacturing (AM) process, the lattice filter being located between the inlet aperture boundary and the outlet aperture boundary. The lattice filter including: a lattice filter body extending from a filter inlet end to a filter outlet end, the lattice filter having a lattice structure; and one or more passageways within the lattice filter body. Each of the one or more passageways includes a passageway inlet located at the filter inlet end and a passageway outlet located at the filter outlet end. Each of the one or more passageways extend from the passageway inlet to the passageway outlet.

In addition to one or more of the features described above, or as an alternative, further embodiments may include that each of the one or more passageways curve, swirl, or spiral between the passageway inlet and the passageway outlet.

In addition to one or more of the features described above, or as an alternative, further embodiments may include that each of the one or more passageways curve, swirl, or spiral around a central longitudinal axis of the lattice filter body between the passageway inlet and the passageway outlet. The central longitudinal axis extends down a center of the lattice filter body from the filter inlet end to the filter outlet end.

In addition to one or more of the features described above, or as an alternative, further embodiments may include that each of the one or more passageways is devoid of the lattice structure of the lattice filter body or contains the lattice structure.

In addition to one or more of the features described above, or as an alternative, further embodiments may include that each of the one or more passageways are a corkscrew passageway formed by a corkscrew wall that spirals around a central longitudinal axis A of the lattice filter body between the passageway inlet and the passageway outlet. The central longitudinal axis extends down a center of the lattice filter body from the filter inlet end to the filter outlet end.

In addition to one or more of the features described above, or as an alternative, further embodiments may include that the corkscrew passageway has the lattice structure of the filter body.

In addition to one or more of the features described above, or as an alternative, further embodiments may include that the corkscrew wall includes one or more orifices.

In addition to one or more of the features described above, or as an alternative, further embodiments may include that the corkscrew wall is solid.

According to another embodiment a method of manufacturing a filter housing and lattice filter for a filter assembly is provided. The filter housing and lattice filter are monolithic. The method includes: defining a filter housing as a tubular shape with an inlet aperture boundary at an inlet end, and an outlet aperture boundary at an outlet end: defining a lattice filter between the inlet aperture boundary and the outlet aperture boundary; and performing an additive manufacturing (AM) process to additively manufacture the filter housing and the lattice filter such that the lattice filter is integral with the filter housing. The lattice filter including: a lattice filter body extending from a filter inlet end to a filter outlet end, the lattice filter having a lattice structure; and one or more passageways within the lattice filter body. Each of the one or more passageways includes a passageway inlet located at the filter inlet end and a passageway outlet located at the filter outlet end. Each of the one or more passageways extend from the passageway inlet to the passageway outlet.

In addition to one or more of the features described above, or as an alternative, further embodiments may include coupling the filter housing to a pump.

In addition to one or more of the features described above, or as an alternative, further embodiments may include that the AM process includes applying laser bed powder fusion.

In addition to one or more of the features described above, or as an alternative, further embodiments may include that each of the one or more passageways curve, swirl, or spiral between the passageway inlet and the passageway outlet.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Fluid systems with pumps use filters so that contaminants are captured and not passed to the pump and then pumped downstream from the pump. The utilization of filters may minimize a reduction in performance and damage to downstream parts. The filter is typically an item that is insertable into a filter housing. There are various drawbacks to having the filter as a separate item from the filter housing. Thus, according to embodiments, the filter and filter housing are formed as a monolithic part, e.g., utilizing additive manufacturing (AM), and specifically Powder bed fusion (PBF). Using AM and software computer aided design (CAD) technologies, it may be feasible to design and fabricate a filter housing and filter as a monolithic structure utilizing powder bed fusion AM techniques. For example, the AM process may enable more flexibility in the design of the monolithic structure.

Figure 1A:
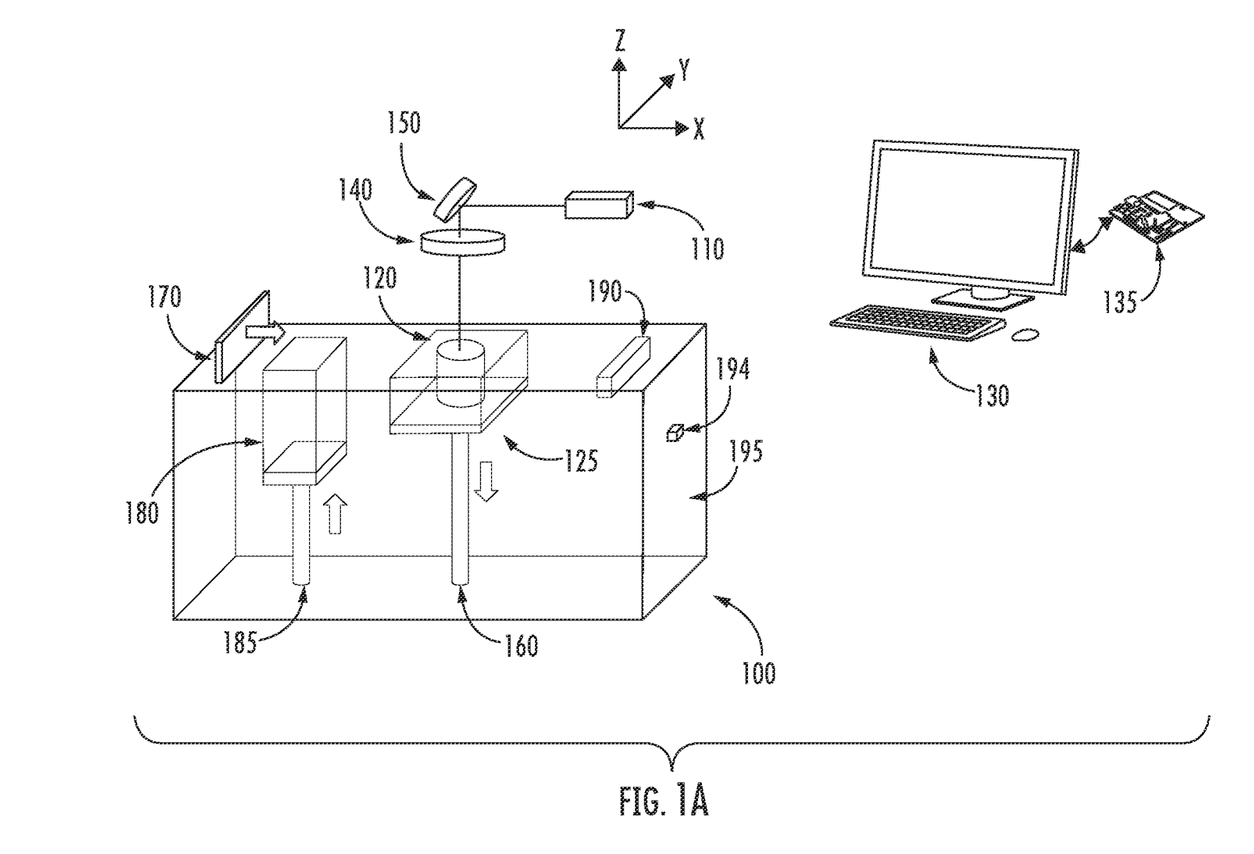
FIG. 1A is a schematic view a powder bed fusion (PBF) process used to manufacture a filter housing and filter, according to an embodiment of the present disclosure.

Referring now to FIG. 1A, a system 100 for performing PBF is illustrated, in accordance with an embodiment of the present disclosure. The system 100 uses a high-energy power laser (laser) 110 to selectively melt or sinter a metallic powder that is located in the powder bed 120. The processes utilize a platform 125 to hold the powder and build upon. In a laser powder bed process, the laser 110 is operationally connected via wired or wireless networks to a computer 130 with an associated controller 135. The laser beam from the laser 110 is reflected by a mirror 150, then passes through a system of lenses 140 and onto the platform 125. The mirror 150 is used to control the laser beam spot movement on the planar (x and y) directions on designed paths. After a layer of powder is selectively melted, the platform 125 moves downward via action of a build piston 160, a recoating blade 170 or brush pushes another layer of fresh powder from a powder dispenser tank 180, which may be moved via a powder supply piston 185, to a top of the previously built surface, and the laser scanning process is repeated. According to an embodiment, aluminum may be the material utilized as the powder. Other materials may also be utilized depending on pressures, temperature and working fluids, e.g., steel, titanium, etc. An overflow container 190 may be provided to recover redundant powder once a layer has been spread. One or more sensors 194 may be provided by which the computer 130 monitors progress of the PBF process. The build chamber 195 of the system 100 is filled with an inert gas, such as argon, to avoid oxidization of the metal as it melts and resolidifies.

Figure 1B:
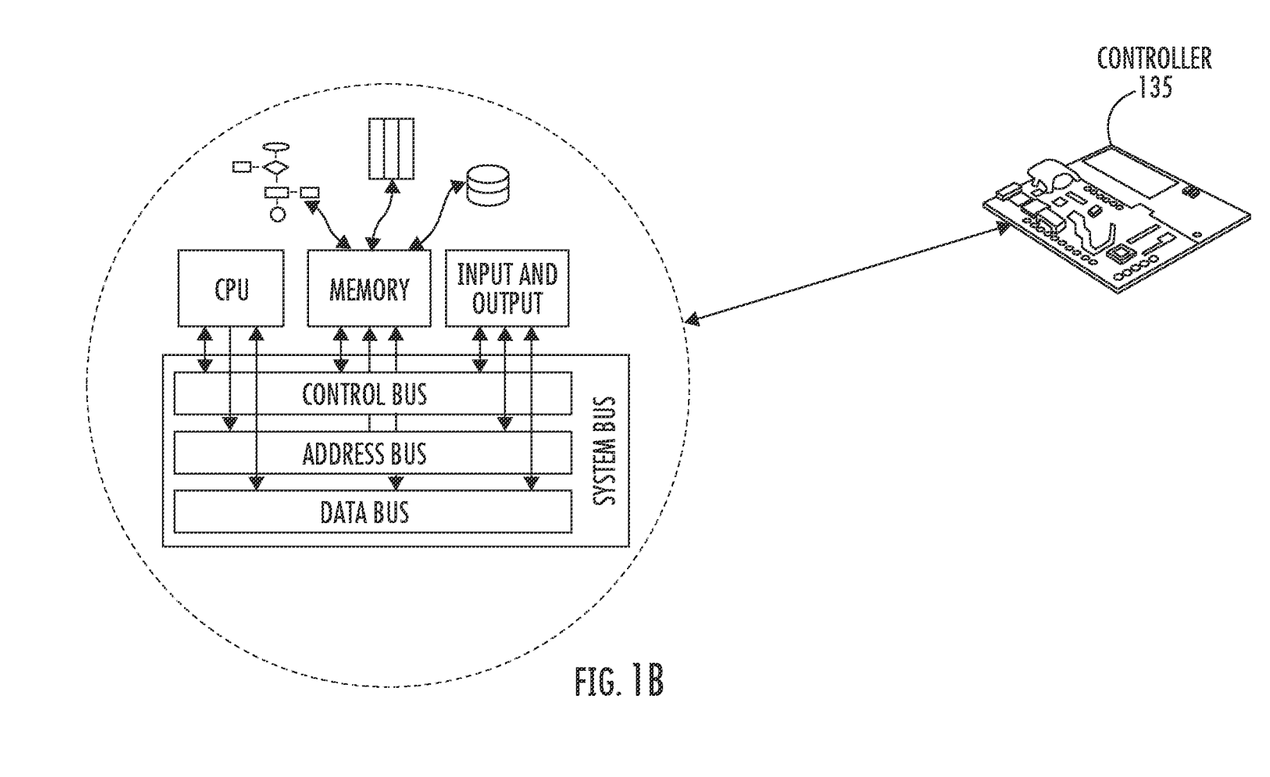
FIG. 1B is a block diagram view of a controller utilized in FIG. 1A, according to an embodiment of the present disclosure.
Figure 2:
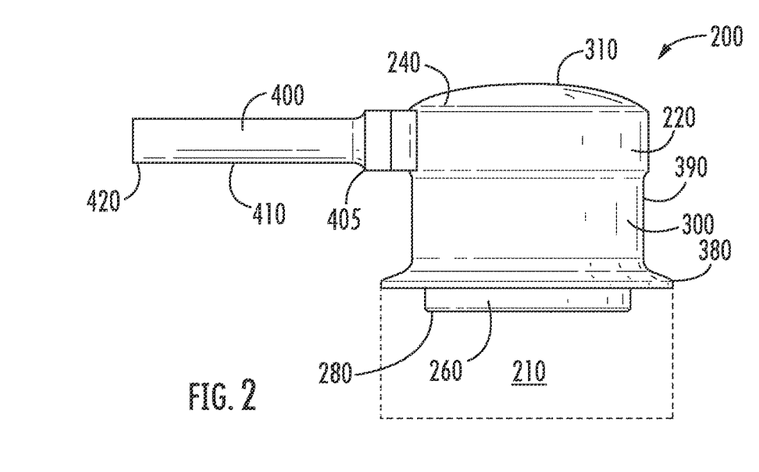
FIG. 2 is a perspective view of a monolithic filter housing and filter manufactured using a PBF process, according to an embodiment of the present disclosure.
Figure 3:
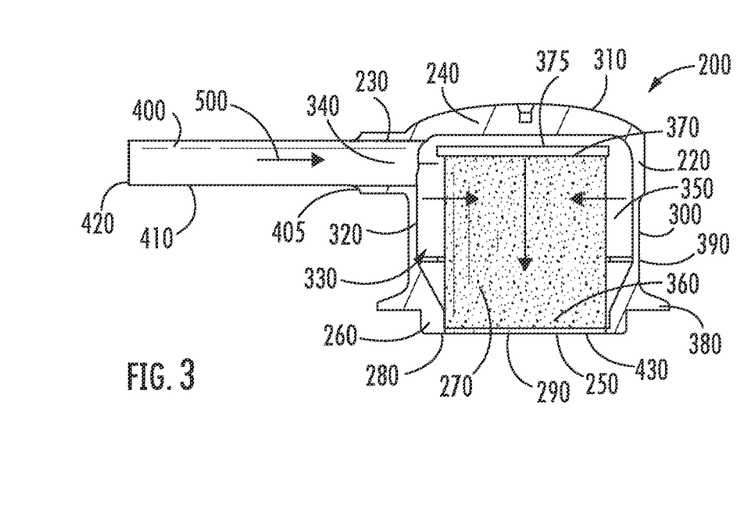
FIG. 3 is a cutaway view of the monolithic filter housing and filter of FIG. 2, according to an embodiment of the present disclosure.
Figure 4:
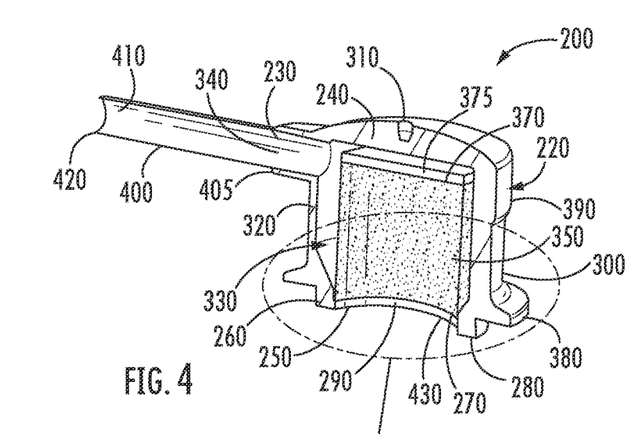
FIG. 4 is a perspective cutaway view of the monolithic filter housing and filter of FIG. 2, according to an embodiment of the present disclosure.
Figure 5:
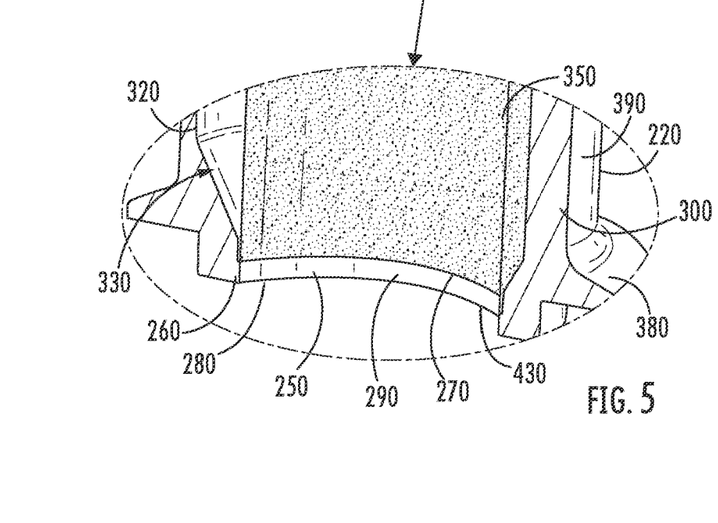
FIG. 5 is an enlarged perspective cutaway view of the monolithic filter housing and filter of FIG. 4, according to an embodiment of the present disclosure.

Referring now to FIG. 1B, with continued reference to FIG. 1A, the controller 135 for the system 100 is illustrated, in accordance with an embodiment of the present disclosure. As shown in FIG. 1B, the controller 135 identified herein may further include, in addition to a processor and nonvolatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection with other processors. Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

Referring now to FIGS. 2, 3, 4, and 5, a filter assembly 200 is illustrated, in accordance with an embodiment of the present disclosure. The filter assembly 200 is composed of a filter housing 220 and a lattice filter 270. The filter housing 220 may also be known as an inlet housing.

The filter assembly 200 is manufactured to be monolithic. In other words, the filter housing 220 and the lattice filter 270 are manufactured together to be monolithic such that the filter assembly 200 is formed as a single piece comprising a unitary structure. In an embodiment, the filter assembly 200 has no joints or seams. The filter assembly 200 may be manufactured or formed via an additive manufacturing technique known to one of skill in the art. In an embodiment, the filter assembly 200 may be manufactured by growing the structure one layer at a time. In an embodiment, the filter assembly 200 may be manufactured by powder bed fusion additive manufacturing.

In an alternative embodiment, the lattice filter 270 may be manufactured via additive manufacturing separately from the filter housing 200 and then inserted into the filter housing 200.

The filter housing 220 has a tubular shape. The filter housing 220 has an inlet end 240 and an outlet end 260, located opposite the inlet end 240, which leads to the pump 210. The filter housing 220 is defined to include an inlet aperture boundary 230 at the inlet end 240 and an outlet aperture boundary 250 at the outlet end 260. The lattice filter 270 is defined to be within each filter housing 220 between the inlet end 240 and the outlet end 260. The configuration of the filter housing 220 is defined on a computer readable medium, such as disclosed below, which will be utilized by the computer 130 (FIGS. 1A and 1B) to manufacture the filter housing 220 and the filter 270 via PBF using, e.g., the system 100 shown in FIGS. 1A and 1B.

The filter assembly 200 may be manufactured by performing an AM process to additively manufacture the filter housing 220 and the lattice filter 270 as integral (e.g., monolithic, unitary) structures.

The filter housing 220 includes a housing bottom surface 280 at the outlet end 260. The housing bottom surface 280 defines the outlet aperture boundary 250 that forms an outlet aperture 290.

The filter housing 220 further includes a housing exterior wall 300 that extends upwardly from the housing bottom surface 280 to a housing top surface 310 at the inlet end 240. The housing exterior wall 300 defines an inner surface 320 to form a tubular cavity 330 between the housing top surface 310 and the housing bottom surfaces 280. Further, the inlet aperture boundary 230, that forms an inlet aperture 340, is defined through the housing exterior wall 300 or the housing top surface 310.

The lattice filter 270 may be have a tubular shape. More specifically, a lattice filter body 350 may extend upwardly from a filter outlet end 360, which may be located at or adjacent the outlet end 260, to a filter inlet end 370 that is at or adjacent the inlet end 240. A filter cap 375 may or may not be present, at the filter inlet end 370, may be configured as a solid surface. A latticed cap would allow fluid to entire the lattice filter 270 via the sides of the lattice filter 270 and not the top.

A mounting flange 380 is defined along an outer surface 390 of the housing exterior wall 300. The mounting flange 380 is configured to mount the filter assembly 200 to a pump 210. An inlet conduit 400 may be integrally formed via the AM process with the inlet aperture boundary 230. The inlet conduit 400 may include a conduit first end 405 that is integrally formed via the AM process with the inlet aperture boundary 230. A conduit body 410 may extend away from the conduit first end 405 to a conduit second end 420.

The filter housing 220 may be formed with a base disk 430 at the outlet end 260. The base disk 430 defines the outlet aperture boundary 250 having an outlet perimeter that is smaller than a housing wall perimeter defined by the inner surface 320 of the housing exterior wall 300. The lattice filter 270 may be integrally formed via the AM process with the base disk 430.

An outer perimeter of the lattice filter 270 may be smaller than the housing wall perimeter. The filter cap 375 of the lattice filter 270 may be spaced apart from the inlet end 240. Fluid may follow the flow arrows 500 through the lattice filter 270.

As shown in FIGS. 2-5, the tubular shape of the filter housing 220 and the tubular shape of the lattice filter 270 may both be cylindrical. However, other shapes are within the scope of the embodiments.

As indicated, the lattice filter 270 may be designed to provide structural support to the filter housing 220, reducing the required structural characteristics of the filter housing itself. That is, the structural integrity of the filter housing 220 may be at least partially provided by the lattice filter 270 rather than being entirely provided from the design of the housing structure itself.

Thus, the disclosed embodiments reduce a complex assembly process to a process of growing a monolithic structure. Benefits of the disclosed embodiments include: 1) reducing part count and simplifying an overall assembly process because the filter is part of the filter housing: 2) providing for many different types of configurations, e.g., the filter housing may have a greater sweep than machining may allow, and the shape, size and design of the filter may be varied and optimized for flow and pressure drop; and 3) utilizing the filter can as a structural support to the housing, being that the filter is integral to the housing, while still functioning as a filter.

Figure 6:
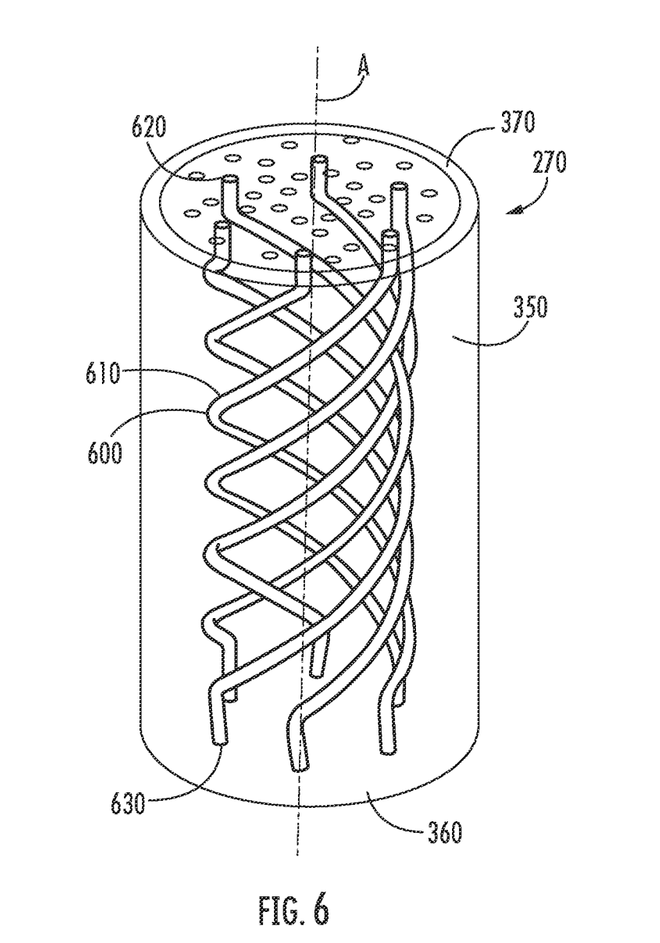
FIG. 6 is a schematic illustration view of a filter with passageways for use in the monolithic filter housing of FIGS. 3-5, according to an embodiment of the present disclosure.
Figure 7:
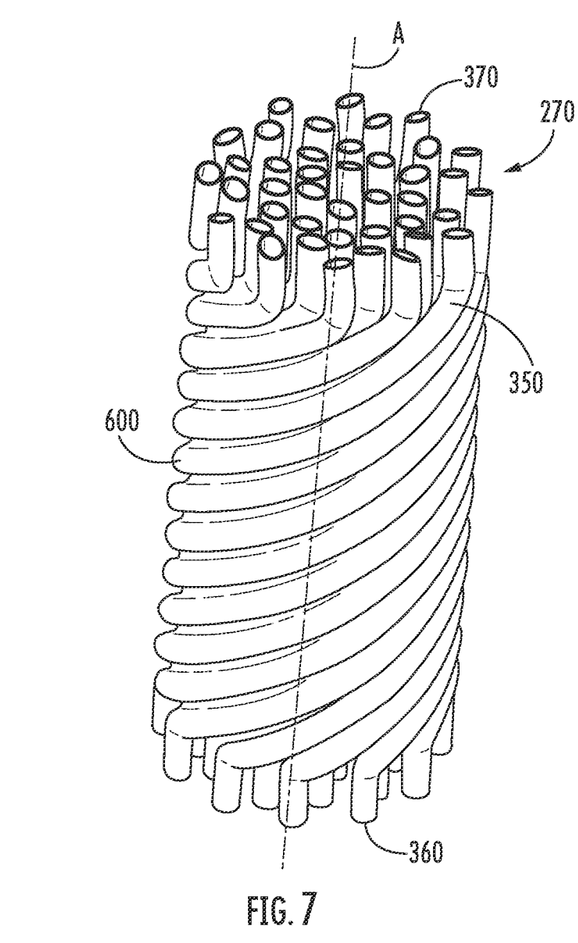
FIG. 7 is a schematic illustration view of the passageways of FIGS. 6, according to an embodiment of the present disclosure.

Referring now to FIGS. 6 and 7, within continued reference to FIGS. 1A, 1B, and 2-5, a lattice filter 270 is illustrated, in accordance with an embodiment of the present disclosure. FIG. 7 illustrates the whole lattice filter 270 with passageways 600 within the lattice filter body 350 while FIG. 6 illustrates only the passageways 600 through the lattice filter 270 with the remaining portions of the lattice filter 270 removed.

As aforementioned, the lattice filter 270 includes a filter inlet end 370 and a filter outlet end 360, located opposite the filter inlet end 370, that fluidly couples to the pump 210. A central longitudinal axis A extends down a center of the lattice filter body 350 from the filter inlet end 370 to the filter outlet end 360.

As illustrated in FIGS. 6 and 7, the lattice filter 270 includes one or more passageways 600 formed within the lattice filter body 350 of the lattice filter 270. The passageways 600 may be tubular in shape, as illustrated in FIG. 7. The remaining portion of the lattice filter body 350 that is not a passageway 600 has a lattice structure, while the passageway 600 is devoid of the lattice structure of the lattice filter body 350. In other words, the passageway 600 does not contain a lattice structure and may be an open void. In another embodiment, if the passageway 600 may also contain a lattice structure to act as a filter. This configured may work well if the passageway 600 is larger.

The passageways 600 extend from a passageway inlet 620 located at the filter inlet end 370 to a passageway outlet 630 located at the filter outlet end 360. The passageways 600 curve, swirl, or spiral between the passageway inlet 620 and the passageway outlet 630. In an embodiment, the passageways 600 curve, swirl, or spiral around the central longitudinal axis A between the passageway inlet 620 and the passageway outlet 630.

The walls 610 of the passageway 600 that form the passageways 600 may have the lattice structure from lattice filter body 350 to allow particulate to escape as the fluid that flows through the passageways 600 is swirled around the central longitudinal axis A. Alternatively, the passageway walls may have a solid structure and are not a lattice.

Advantageously, the spiral shape of the passageways 600 creates a predetermined swirl direction for the fluid flow, which minimizes the work (energy/electricity) needed for the motor of the pump 210 to spin its impeller in that direction as the flow already wants to spin in that direction.

Figure 8:
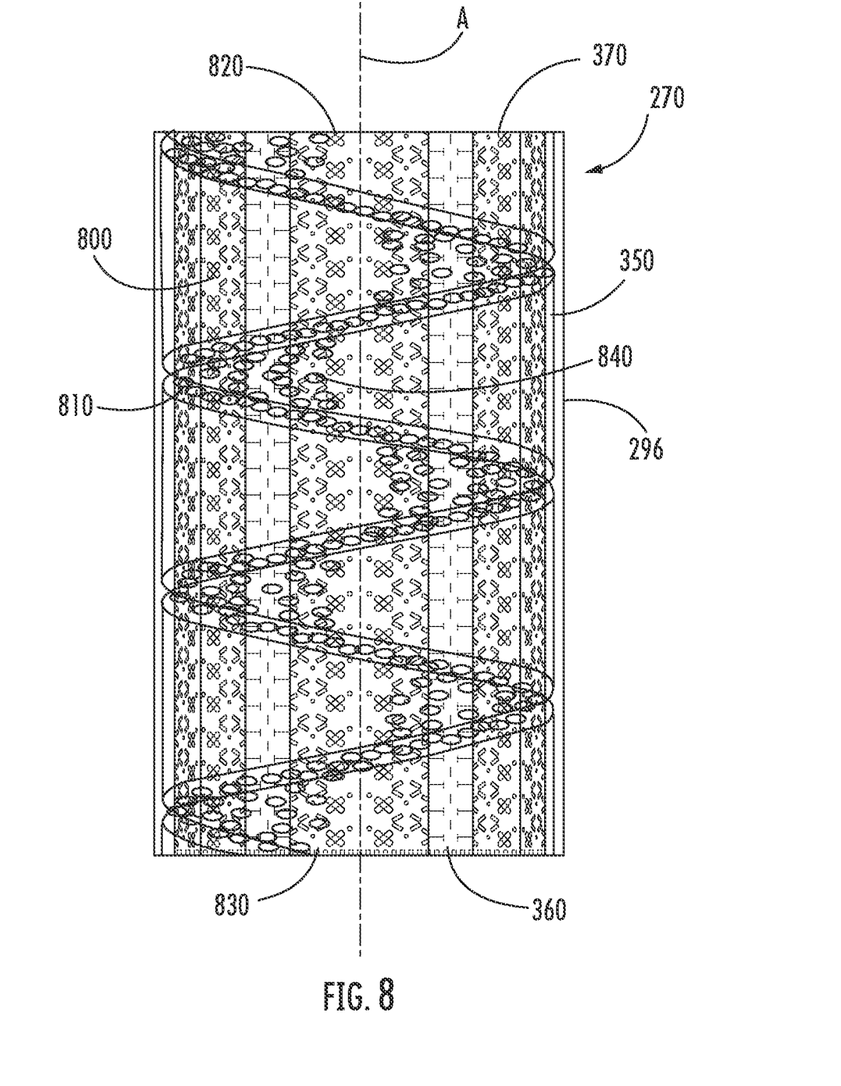
FIG. 8 is a schematic illustration view of a filter with a corkscrew passageway for use in the monolithic filter housing of FIGS. 3-5, according to an embodiment of the present disclosure.

Referring now to FIG. 8, within continued reference to FIGS. 1A, 1B, and 2-7, a lattice filter 270 is illustrated, in accordance with an embodiment of the present disclosure. FIG. 8 illustrates the whole lattice filter 270 with a corkscrew passageway 800 formed within the lattice filter body 350.

As aforementioned, the lattice filter 270 includes a filter inlet end 370 and a filter outlet end 360 located opposite the filter inlet end 370. The central longitudinal axis A extends down a center of the lattice filter 270 from the filter inlet end 370 to the filter outlet end 360.

As illustrated in FIG. 8, the lattice filter 270 includes a corkscrew passageway 800 formed within the lattice filter body 350 of the lattice filter 270. The corkscrew passageway 800 extends between the central longitudinal axis A and a radially outer wall 296 of the lattice filter 270 as the corkscrew passageway 800 corkscrews around the central longitudinal axis A between the filter inlet end 370 and the filter outlet end 360. The corkscrew passageway 800 is formed by and/or bounded on a top and a bottom side by a corkscrew wall 810 that spirals around the central longitudinal axis A between the filter inlet end 370 and the filter outlet end 360. The corkscrew wall 810 may be a solid structure or non-lattice structure that weaves or spirals its way through the lattice structure of the filter body 350. The corkscrew passageway 800 itself may have the lattice structure of the filter body 350. The corkscrew wall 810 of the passageway 800 that form the corkscrew passageway 800 may have one or more orifices 840 to allow fluid to flow through the orifices 840 rather than following the corkscrew passageway 800 and swirl around the central longitudinal axis A. Alternatively, the corkscrew wall 810 may be solid with no orifices 840 or holes.

If the corkscrew wall 810 is solid wall, then pressure drop in the system increases and the pump may have to work harder to flow fluid through the system. Advantageously, the orifices 840 help to reduce that pressure drop. Also advantageously, the corkscrew shape of the corkscrew passageway 800 creates a predetermined swirl direction for the fluid flow, which minimizes the work (energy/electricity) needed for the motor of the pump 210 to spin its impeller in that direction as the flow already wants to spin in that direction.

The corkscrew passageway 800 extend from a passageway inlet 820 located at the filter inlet end 370 to a passageway outlet 830 located at the filter outlet end 360. The passageway 800 curves, swirls, or spirals between the passageway inlet 820 and the passageway outlet 830. In an embodiment, the passageway 800 curves, swirls, or spirals around the central longitudinal axis A between the passageway inlet 820 and the passageway outlet 830.

Figure 9:
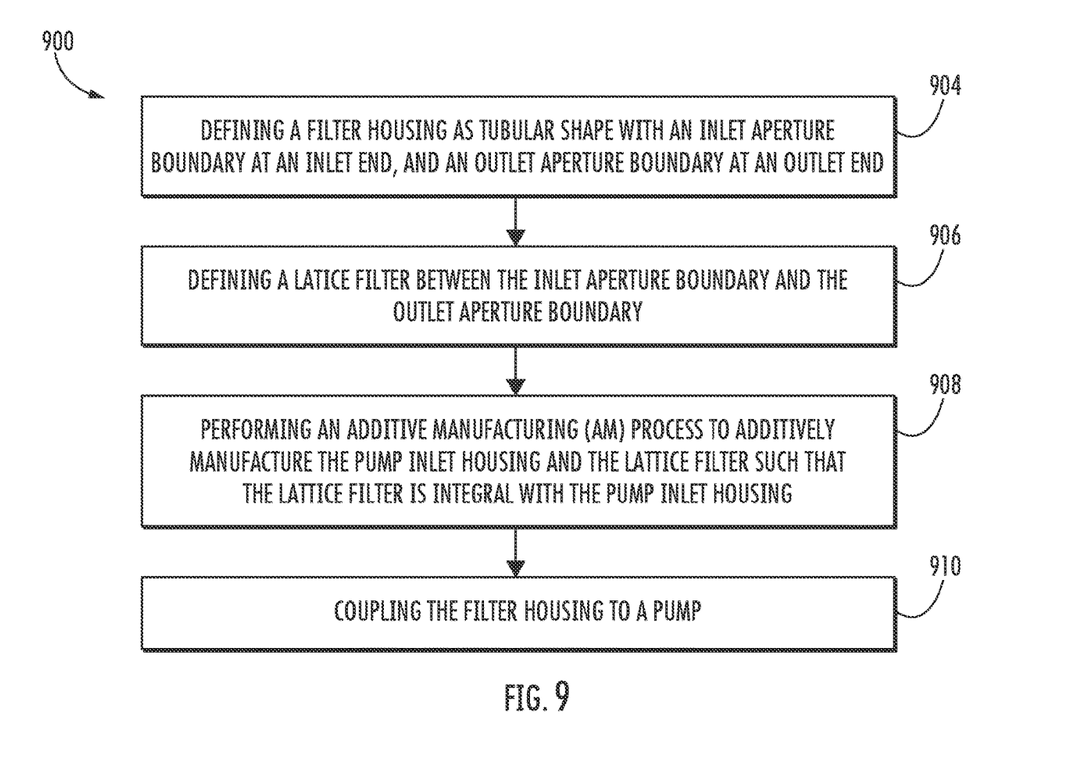
FIG. 9 is a flowchart illustrating a method of fabricating the monolithic filter housing and filter of FIGS. 2-8, according to an embodiment of the present disclosure.

Referring now to FIG. 9, with continued reference to FIGS. 1-4, a flow chart of a method 900 of manufacturing a filter housing 220 and lattice filter 270 for a filter assembly 200 is illustrated, in accordance with an embodiment of the disclosure. The filter housing 220 and lattice filter 270 are monolithic.

At block 904, a filter housing 220 is defined as a tubular shape with an inlet aperture boundary 230 at an inlet end 240, and an outlet aperture boundary 250 at an outlet end 260.

At block 906, a lattice filter 270 is defined between the inlet aperture boundary 230 and the outlet aperture boundary 250.

At block 908, an AM process is performed to additively manufacture the filter housing 220 and the lattice filter 270 such that the lattice filter 270 is integral with the filter housing 220.

The lattice filter 270 includes a lattice filter body 350 extending from a filter inlet end 370 to a filter outlet end 360. The lattice filter 270 having a lattice structure. The lattice filter 270 also includes one or more passageways 600, 800 within the lattice filter body 350. Each of the one or more passageways 600, 800 includes a passageway inlet 620, 820 located at the filter inlet end 370 and a passageway outlet 630, 830 located at the filer outlet end 360. Each of the one or more passageways 600, 800 extend from the passageway inlet 620, 820 to the passageway outlet 630, 830. Each of the one or more passageways 600, 800 curve, swirl, or spiral between the passageway inlet 620, 820 and the passageway outlet 630, 830.

At block 910, the filter housing 220 is coupled to a pump 210.

The method 900 may further include that the AM process comprises applying laser bed powder fusion.

Technical effects and benefits of the features described herein include forming spiral passageways within a filter for a pump using additive manufacturing.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lattice filter for use in an inlet housing of a pump assembly, the lattice filter comprising:
    a lattice filter body extending from a filter inlet end to a filter outlet end, the lattice filter having a lattice structure; and
    one or more passageways within the lattice filter body,
    wherein each of the one or more passageways includes a passageway inlet located at the filter inlet end and a passageway outlet located at the filter outlet end,
    wherein each of the one or more passageways extend from the passageway inlet to the passageway outlet;
    wherein each of the one or more passageways are a corkscrew passageway formed by a corkscrew wall that spirals around a central longitudinal axis A of the lattice filter body between the passageway inlet and the passageway outlet, the central longitudinal axis extends down a center of the lattice filter body from the filter inlet end to the filter outlet end; and
    wherein the corkscrew wall is solid.

2. The lattice filter of claim 1, wherein each of the one or more passageways curve, swirl, or spiral between the passageway inlet and the passageway outlet.

3. The lattice filter of claim 1, wherein each of the one or more passageways curve, swirl, or spiral around a central longitudinal axis of the lattice filter body between the passageway inlet and the passageway outlet, the central longitudinal axis extends down a center of the lattice filter body from the filter inlet end to the filter outlet end.

4. The lattice filter of claim 1, wherein each of the one or more passageways is devoid of the lattice structure of the lattice filter body or contains the lattice structure.

5. The lattice filter of claim 1, wherein the corkscrew passageway has the lattice structure of the filter body.

6. A filter assembly, wherein the filter assembly is monolithic and comprises:
    a filter housing having a tubular shape with an inlet aperture boundary at an inlet end and an outlet aperture boundary at an outlet end;
    a lattice filter that is integrally formed with the filter housing via an additive manufacturing (AM) process, the lattice filter being located between the inlet aperture boundary and the outlet aperture boundary, the lattice filter comprising:
    a lattice filter body extending from a filter inlet end to a filter outlet end, the lattice filter having a lattice structure; and
    one or more passageways within the lattice filter body,
    wherein each of the one or more passageways includes a passageway inlet located at the filter inlet end and a passageway outlet located at the filter outlet end,
    wherein each of the one or more passageways extend from the passageway inlet to the passageway outlet;
    wherein each of the one or more passageways are a corkscrew passageway formed by a corkscrew wall that spirals around a central longitudinal axis A of the lattice filter body between the passageway inlet and the passageway outlet, the central longitudinal axis extends down a center of the lattice filter body from the filter inlet end to the filter outlet end; and
    wherein the corkscrew wall is solid.

7. The filter assembly of claim 6, wherein each of the one or more passageways curve, swirl, or spiral between the passageway inlet and the passageway outlet.

8. The filter assembly of claim 6, wherein each of the one or more passageways curve, swirl, or spiral around a central longitudinal axis of the lattice filter body between the passageway inlet and the passageway outlet, the central longitudinal axis extends down a center of the lattice filter body from the filter inlet end to the filter outlet end.

9. The filter assembly of claim 6, wherein each of the one or more passageways is devoid of the lattice structure of the lattice filter body or contains the lattice structure.

10. The filter assembly of claim 6, wherein the corkscrew passageway has the lattice structure of the filter body.

11. A method of manufacturing a filter housing and lattice filter for a filter assembly, wherein the filter housing and lattice filter are monolithic, the method comprising:
    defining a filter housing as a tubular shape with an inlet aperture boundary at an inlet end, and an outlet aperture boundary at an outlet end;
    defining a lattice filter between the inlet aperture boundary and the outlet aperture boundary; and
    performing an additive manufacturing (AM) process to additively manufacture the filter housing and the lattice filter such that the lattice filter is integral with the filter housing,
    the lattice filter comprising:
    a lattice filter body extending from a filter inlet end to a filter outlet end, the lattice filter having a lattice structure; and
    one or more passageways within the lattice filter body,
    wherein each of the one or more passageways includes a passageway inlet located at the filter inlet end and a passageway outlet located at the filter outlet end,
    wherein each of the one or more passageways extend from the passageway inlet to the passageway outlet;
    wherein each of the one or more passageways are a corkscrew passageway formed by a corkscrew wall that spirals around a central longitudinal axis A of the lattice filter body between the passageway inlet and the passageway outlet, the central longitudinal axis extends down a center of the lattice filter body from the filter inlet end to the filter outlet end; and
    wherein the corkscrew wall is solid.

12. The method of claim 11, further comprising:
    coupling the filter housing to a pump.

13. The method of claim 11, wherein the AM process comprises applying laser bed powder fusion.

14. The method of claim 11, wherein each of the one or more passageways curve, swirl, or spiral between the passageway inlet and the passageway outlet.

* * * * *